US012548251B2

(12) United States Patent
Gorodissky et al.

(10) Patent No.: US 12,548,251 B2
(45) Date of Patent: Feb. 10, 2026

(54) SYSTEM AND METHOD FOR RECONSTRUCTION OF A THREE-DIMENSIONAL HUMAN HEAD MODEL FROM A SINGLE IMAGE

(71) Applicant: DE-IDENTIFICATION LTD., Tel Aviv (IL)

(72) Inventors: Or Gorodissky, Tel Aviv (IL); Amitay Nachmani, Tel Aviv (IL); Matan Feldman, Tel Aviv (IL); Eliran Kuta, Tel Aviv (IL); Gil Perry, Tel Aviv (IL); Sella Blondheim, Tel Aviv (IL)

(73) Assignee: DE-IDENTIFICATION LTD., Tel Aviv (IL)

( * ) Notice: Subject to any disclaimer, the term of this patent is extended or adjusted under 35 U.S.C. 154(b) by 0 days.

(21) Appl. No.: 18/894,035

(22) Filed: Sep. 24, 2024

(65) Prior Publication Data
US 2025/0014274 A1    Jan. 9, 2025

Related U.S. Application Data

(63) Continuation-in-part of application No. 18/539,427, filed on Dec. 14, 2023, now Pat. No. 12,190,450.
(Continued)

(51) Int. Cl.
*G06T 17/00* (2006.01)
*G06T 7/10* (2017.01)
(Continued)

(52) U.S. Cl.
CPC ............. *G06T 17/00* (2013.01); *G06T 7/10* (2017.01); *G06T 13/40* (2013.01); *G06V 10/44* (2022.01); *G06V 40/171* (2022.01)

(58) Field of Classification Search
None
See application file for complete search history.

(56) References Cited

U.S. PATENT DOCUMENTS 6,556,196 B1 * 4/2003 Blanz ................... G06V 40/175
345/646
11,769,309 B2 * 9/2023 Powers ................ G06V 10/82
345/473
(Continued)

FOREIGN PATENT DOCUMENTS

GB    2581374        8/2020
GB    2581374 A  *  8/2020  ............. G06T 17/00

OTHER PUBLICATIONS

Gu et al; Stylenerf: A Style-based 3D-Aware Generator for High-Resolution Image Synthesis; Oct. 18, 2021.
(Continued)

*Primary Examiner* — Hilina K Demeter
(74) *Attorney, Agent, or Firm* — PEARL COHEN ZEDEK LATZER BARATZ LLP

(57) ABSTRACT

System and method for reconstructing a three-dimensional (3D) face model from an input 2D image of the face, including: feeding the input 2D image into at least one preparatory network to generate 3D landmarks (L'), facial features (F') and segmentation maps (S'); feeding the 3D landmarks (L'), the facial features (F'), and the segmentation maps (S') to a parameter regressor network (M1) to predict parameters of a 3D face parametric model (P'), camera parameters (C'), hair parameters (H') and wrinkle parameters (W'); generating an initial UV texture map (UV_0') using the input 2D image and (P', C', H', W'); feeding the initial UV texture map (UV_0') into a UV completion network (M2) to generate a full UV texture map (UV') and illumination parameters (LI'); and generating the 3D face model using (P', C', H', W', UV', LI').

20 Claims, 8 Drawing Sheets

Related U.S. Application Data

(60) Provisional application No. 63/435,584, filed on Dec. 28, 2022.

(51) Int. Cl.
*G06T 13/40* (2011.01)
*G06V 10/44* (2022.01)
*G06V 40/16* (2022.01)

(56) References Cited

U.S. PATENT DOCUMENTS

| | | | |
|---|---|---|---|
| 2016/0379041 | A1 | 12/2016 | Rhee |
| 2017/0154461 | A1* | 6/2017 | Rhee .................... G06V 10/426 |
| 2019/0228556 | A1* | 7/2019 | Wang ...................... G06T 17/00 |
| 2021/0287430 | A1 | 9/2021 | Li |
| 2021/0360199 | A1* | 11/2021 | Oz .......................... G06N 3/094 |
| 2021/0390770 | A1* | 12/2021 | Kuo ..................... G06V 40/165 |
| 2022/0051412 | A1* | 2/2022 | Gronau ................ G06V 40/172 |
| 2022/0370733 | A1 | 11/2022 | Mireles et al. |
| 2022/0374649 | A1* | 11/2022 | Naruniec ............. G06N 3/0464 |
| 2023/0031750 | A1* | 2/2023 | Li ........................... G06T 17/20 |

OTHER PUBLICATIONS

Or-El et al; SyleSDF: High Resolution 3D-Consistent Image and Geometry Generation, Mar. 30, 2022.

ShahRukh Athar et al; RigNeRF: Fully Controllable Neural 3D Portraits, Downloaded Dec. 2022.

Grassal et al: Neural Head Avatars from Monocular RGB Videos, Mar. 28, 2022.

Wojciech Zielonka et al; Towards Metrical Reconstruction of Human Faces, Apr. 13, 2022.

Yufeng Zheng et al; I M Avatar: Implicit Morphable Head Avatars from Videos, Apr. 19, 2022.

ShahRukh Athar et al; FLAME-in-NeRF: Neural control of Radiance Fields for Free View Face Animation, Aug. 10, 2021.

Sicheng Xu et al; Deep 3D Portrait from a Single Image, Apr. 24, 2020.

Yao Feng et al; Learning an Animatable Detailed 3D Face Model from In-The-Wild Images, ACM Trans Graph, vol. 40, No. 4, Article 88, Publication date: Aug. 2021.

Patel et al;3D facial model reconstruction, expressions synthesis and animation using single frontal face image;SIViP (2013) 7:889-897.

Xu et al., "Deep 3D Portrai from a Single Image" (Year: 2020).

Notice of Allowance mailed on Sep. 26, 2024 in U.S. Appl. No. 18/539,427.

\* cited by examiner

SYSTEM AND METHOD FOR RECONSTRUCTION OF A THREE-DIMENSIONAL HUMAN HEAD MODEL FROM A SINGLE IMAGE

CROSS-REFERENCE TO RELATED APPLICATIONS

This Application is a continuation of U.S. application Ser. No. 18/539,427, published as United States Application Publication Serial Number 2024/0221316 and entitled "SYSTEM AND METHOD FOR RECONSTRUCTION OF A THREE-DIMENSIONAL HUMAN HEAD MODEL FROM A SINGLE IMAGE", which in turn claims the benefit of U.S. Provisional Application Ser. No. 63/435,584, filed Dec. 28, 2022, which is hereby incorporated by reference in its entirety.

FIELD OF THE INVENTION

Embodiments of the present invention relate generally to the field of computer graphics. More specifically, embodiments of the present invention relate to reconstruction of a three-dimensional human head model from a single image.

BACKGROUND

Three-dimensional (3D) human head reconstruction from a single image, also referred to as single view reconstruction (SVR), is a well-known task in the field computer-graphics, where one static image of a human head is used for regressing the parameters of an underlining 3D head parametric model. Using the regressed parameters, a human head mesh may be generated along with a UV texture map and a predefined rig for animation. Animatable 3D human heads are useful for many commercial applications, including gaming, movie production, e-commerce, e-learning, video photography and face anonymization.

The SVR task may be complicated, as a single two-dimensional (2D) image may inherently lack some information of both the 3D geometrical structure of the face, commonly referred to as the shape, and its appearance, commonly referred to as the texture.

There is a large body of work for 3D reconstruction of the human head from a two-dimensional (2D) image. However most prior art studies fail to generate a 3D head model of high quality. In one study, a 3D morphable face model (3DMM) parameters of BASEL face model (a type of a face model) and hair depth are inferred from a 2D image. Based on the depth a hair mesh is created. Amination is performed using the hair mesh and 3DMM parameters to manipulate the head and render the new image which is then blended back to the original image using another blending network. In a second study, the 3D faces learned with an articulated model and expressions (FLAME) parameters are reconstructed from a single image using a neural network (NN). The NN is based on ArcFace (additive angular margin loss for deep face recognition) as a backbone for shape estimation. The NN itself only regresses the shape parameters, while the expression parameters are inferred using a separate optimization step. In yet another study, the 3D faces learned with FLAME parameters are reconstructed from a single image using a NN. Fine details for wrinkles are also predicted. Using a residual neural network (ResNet) architecture features are extracted and several different heads are used to regress all the 3D parameters including camera parameters and the parameters for a texture principal component analysis (PCA) used for UV creation.

SUMMARY

According to embodiments of the invention, a computer-based system and method for reconstructing a three-dimensional (3D) face model from an input 2D image of the face, may include: feeding the input 2D image into at least one preparatory network to generate image features; feeding the image features to a parameter regressor network (M1) to predict at least one of: parameters of a 3D face parametric model (P'), camera parameters (C'), hair parameters (H') and wrinkle parameters (W'); generating an initial UV texture map (UV_0') using the input 2D image and the at least one of (P', C', H', W'); feeding the initial UV texture map (UV_0') into a UV completion network (M2) to generate a full UV texture map (UV') and illumination parameters (LI'); and generating the 3D face model using (P', C', H', W', UV', LI'), wherein the parameter regressor network and the UV completion network are jointly trained using, as the input 2D image, a synthetic 2D image that is generated from a set of synthetic parameters.

Embodiments of the invention may include rendering a rendered 2D image from the 3D face model; calculating a loss function based on differences between the input 2D image and the rendered 2D image; and training the parameter regressor network (M1) and the UV completion network (M2) using the loss function to obtain a trained parameter regressor network (TM1) and a trained UV completion network (M2).

According to embodiments of the invention, the image features may include 3D landmarks (L'), facial features (F'), and segmentation maps (S'), and the at least one preparatory network may include: a 3D landmark detector network used to obtain the 3D landmarks (L'); a feature extractor (FE) network used to obtain facial features (F'); and a face segmentation (FS) network used to obtain segmentation maps (S').

According to embodiments of the invention, the 3D face parametric model may be a faces learned with an articulated model and expressions (FLAME) model, and the parameters of the 3D face parametric model (P') may include jaw parameters (P_JAW'), neck parameters (P_NECK'), translation parameters (P_TRANSLATION'), camera parameters (C'), shape parameters (P_SHAPE') and expression parameters (P_EXPRESSION').

According to embodiments of the invention, the feature extractor network may include a pre-trained face recognition network to produce face recognition embedding (FR), a pre-trained expression recognition network to produce an expression embedding (EF), and a pre-trained animation keypoint network to produce a mouth animation keypoint (KP).

According to embodiments of the invention, wherein the parameter regressor network (M1) may include subnetworks M1_0, M1_1, M1_2, M1_3, and feeding the 3D landmarks (L'), the facial features (F'), and the segmentation maps (S') into the parameter regressor network (M1) may include: feeding the 3D landmarks (L) into M1_0 to predict jaw parameters (P_JAW'), neck parameters (P_NECK') and translation parameters (P_TRANSLATION') and camera parameters (C'); feeding the face recognition embedding (FR') into M1_1 to predict shape parameters (P_SHAPE'); feeding the expression embedding (EF') and the mouth animation keypoint (KP) into M1_2 to predict expression parameters (P_EXPRESSION') and wrinkle parameters (W'); and feeding the shape parameters (P_SHAPE') and the segmentation maps (S') into M1_3 to predict the hair parameters (H'), where the parameters of the 3D face parametric model (P') may include the jaw parameters (P_JAW'), the neck parameters (P_NECK'), the translation parameters (P_TRANSLATION'), the shape parameters (P_SHAPE') and the expression parameters (P_EXPRESSION').

According to embodiments of the invention, the input 2D image may include a synthetic image, the method may include: selecting a set of synthetic parameters of the 3D face parametric model (P), synthetic camera parameters (C), synthetic hair parameters (H) and synthetic wrinkle parameters (W); and generating the input 2D image from the set of synthetic parameters P, C, H, W.

According to embodiments of the invention, the loss function may include a combination of at least one of: a regression loss calculated between each one of the parameters P', C', H', W' and the synthetic parameters P, C, H, W of the input 2D image, a perceptual loss calculated between each one of the parameters P', C', H', W' and the synthetic parameters P, C, H, W of the input 2D image, a reconstruction loss calculated between the input 2D image and the rendered 2D image, and a perceptual loss calculated between the input 2D image and the rendered 2D image.

According to embodiments of the invention, the input 2D image may include a real image.

According to embodiments of the invention, the loss function may include a combination of at least one of: a reconstruction loss calculated between the input 2D image and the rendered 2D image, a perceptual loss calculated between the input 2D image and the rendered 2D image, a regularization loss calculated on the shape parameters (P_SHAPE') and the expression parameters (P_EXPRESSION'), a consistency loss calculated on the shape parameters (P_SHAPE') of input 2D mages of a single person taken from different angles, and a consistency loss calculated on the full UV texture maps (UV') of input 2D mages of a single person taken from different angles.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanying drawings. Embodiments of the invention are illustrated by way of example and not limitation in the figures of the accompanying drawings, in which like reference numerals indicate corresponding, analogous or similar elements, and in which:

Figure 1:
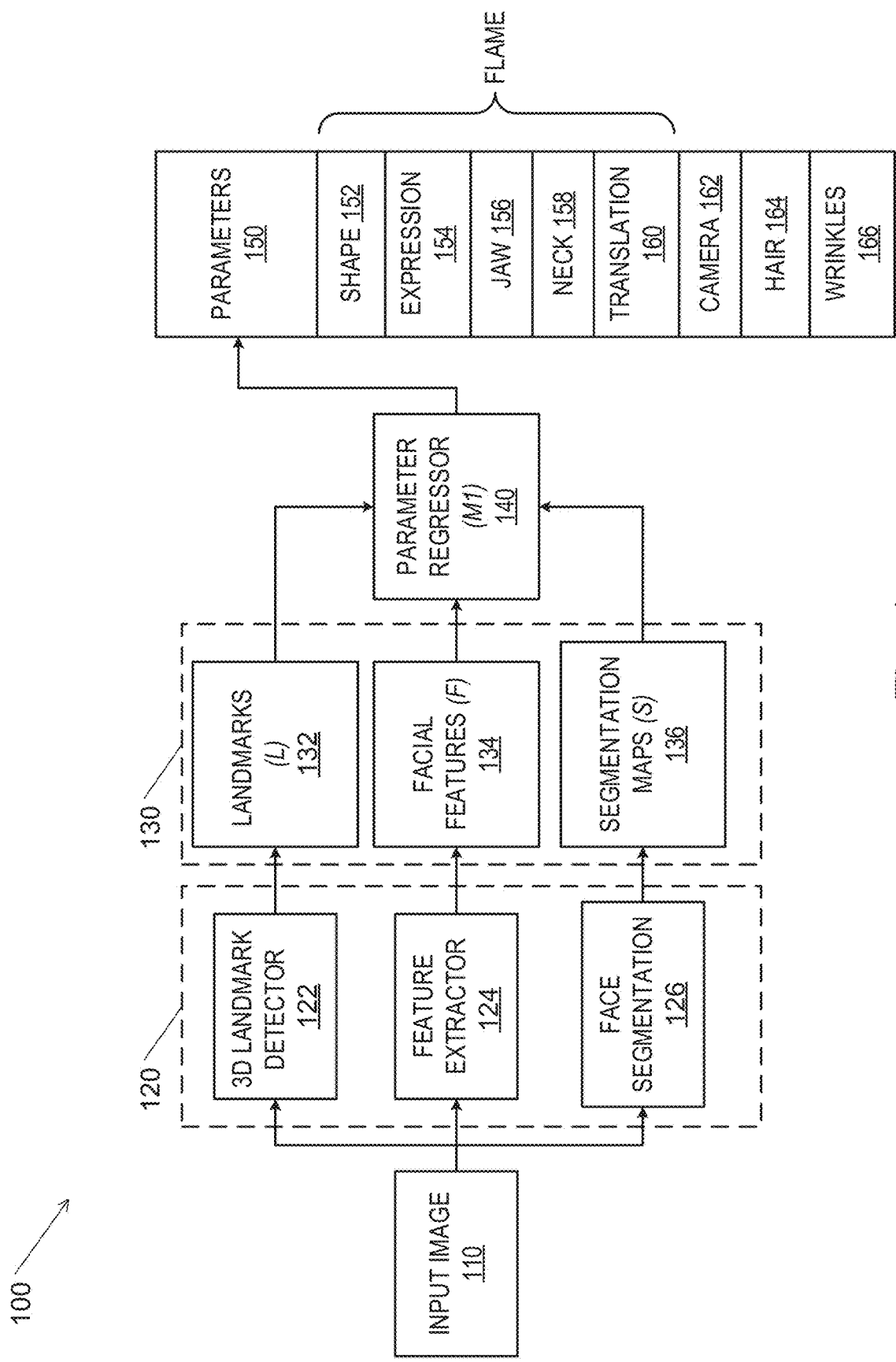
FIG. 1 depicts a system for predicting parameters of an input image, according to embodiment of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, and components, modules, units and/or circuits have not been described in detail so as not to obscure the invention.

According to embodiments of the invention, machine learning models disclosed herein, also referred herein as networks, may include one or more artificial neural networks (NN). NNs are mathematical models of systems made up of computing units typically called neurons (which are artificial neurons or nodes, as opposed to biological neurons) communicating with each other via connections, links or edges. In common NN implementations, the signal at the link between artificial neurons or nodes can be for example a real number, and the output of each neuron or node can be computed by function of the (typically weighted) sum of its inputs, such as a rectified linear unit (ReLU) function. NN links or edges typically have a weight that adjusts as learning or training proceeds typically using a loss or cost function. The weight may increase or decrease the strength of the signal at a connection. Typically, NN neurons or nodes are divided or arranged into layers, where different layers can perform different kinds of transformations on their inputs and can have different patterns of connections with other layers. NN systems can learn to perform tasks by considering example input data, generally without being programmed with any task-specific rules, being presented with the correct output for the data, and self-correcting, or learning using the loss function. A NN may be configured or trained for a specific task, e.g., image processing, pattern recognition or classification. Training a NN for the specific task may involve adjusting these weights based on examples (e.g., labeled data included in the training dataset). Each neuron of an intermediate or last layer may receive an input signal, e.g., a weighted sum of output signals from other neurons, and may process the input signal using a linear and/or nonlinear function (e.g., an activation function). The results of the input and intermediate layers may be transferred to other neurons and the results of the output layer may be provided as the output of the NN. For example, in a NN algorithm known as the gradient descent algorithm, the results of the output layer may be compared to the labels of the samples in the training dataset, and a loss or cost function (such as the root-mean-square error) may be used to calculate a difference between the results of the output layer and the labels. The weights of some of the neurons may be adjusted using the calculated differences, in a process that iteratively minimizes the loss or cost until satisfactory metrics are achieved or satisfied. A processor, e.g., central processing units (CPU), graphical processing units or fractional graphical processing units (GPU) or tensor processing units (TPU) or a dedicated hardware device may perform the relevant calculations on the mathematical constructs representing the NN. As used herein a NN may include deep neural networks (DNN), convolutional neural networks (CNN), recurrent neural networks (RNN), long short-term memory networks (LSTM)probabilistic neural networks (PNN), time delay neural network (TDNN), deep stacking network (DSN), generative adversarial networks (GAN), recurrent neural network (RNN), long short-term memory (LSTM), etc. For example, a CNN can be a deep, feed-forward network, which includes one or more convolutional layers, fully connected layers, and/or pooling layers. CNNs are particularly useful for visual applications.

Some algorithms for training a NN model such as mini-batch gradient descent may enable training the NN model using mini-batches of data taken from the training dataset. When using mini-batch gradient descent to train a NN model, the training dataset may be divided into a plurality of mini-batches. Then, each sample in the mini-batch may be provided as input to the NN model and a prediction may be made. At the end of training session using the mini-batch, the resulting predictions are compared to the expected output variables, and loss or cost function is calculated. The loss or cost function is then used to train the NN model, e.g., to adjust the model weights, for example using backpropagation and/or other training methods. A mini-batch of data may include a plurality of samples from the training dataset. Embodiments of the invention may use a loss function. The loss function may be used in the training process to adjust weights and other parameters in the various networks in a back propagation process.

A digital image, also referred to herein simply as an image, may include a visual (e.g., optical) representation of physical objects, specifically, a face of a human, provided in any applicable digital and computer format. Images may include a simple 2D array or matrix of computer pixels, e.g., values representing one or more light wavelengths or one or more ranges of light wavelength, within the visible light, in specified locations, or any other digital representation, provided in any applicable digital format such as jpg, bmp, tiff, etc. A digital image may be provided in a digital image file containing image data.

A 3D head model, also referred to as a 3D face model, may be a digital representation of a 3D human head, including a 3D mesh and full UV texture map used for animation purposes, e.g., for a 3D animation of the head. The model may include a rig, e.g., a definition or representations of a digital skeleton that enables the 3D head model to move, e.g., defines how the face and mouth of the 3D head model move when the animated character speaks or how the 3D head model raises an eyebrow. The 3D head model may be provided in any applicable format including .blend .obj .c4d .3ds .max .ma and many more formats. The 3D mesh may refer to a digital collection of vertices, edges, and polygons (all are computerized mathematical constructs) that together define a computerized 3D object. The vertices are coordinates in the 3D space, the edges each connect two adjacent vertices, and the polygons each enclose adjacent edges to form the surface of the 3D object. A UV texture map may refer to a 2D representation of a 3D object, where the letters "U" and "V" denote the X and Y axes of the 2D representation, e.g., the 2D representation may correspond to the 3D model being unfolded and laid out flat on a 2D plain. The UV texture map may be used to generate a 3D model in a 3D modeling process, referred to as wrapping, by projecting the 2D representation (e.g., the UV texture map) onto the surface of the 3D model.

Embodiments of the invention may provide a system and method for generating or reconstructing a 3D head model that includes hair and wrinkles, usable for computer amination, based on a single 2D input image of the face. The 3D head model may further include a fully rigged mesh and a full UV texture map for animation purposes. Embodiments may include using a variety of networks (e.g., NNs), some pretrained, and other trained as disclosed herein. Embodiments of the invention may improve prior technology and provide a high-resolution mesh of the 3D head model that includes a full head, hair and wrinkles that is fully rigged and ready to be animated. Additionally, embodiments of the invention may provide exceptionally high (in comparison to prior art) expression detail and high expression regression of the 3D head model (avatar) from a single image.

Accordingly, embodiments of the invention may improve the technology of computer animation by providing a high-quality 3D head model that is exceptionally detailed based on a single image of the face. The animatable 3D human head generated using embodiments of the invention may be useful for many commercial applications, including movie production, e-commerce, video photography and face anonymization.

Figure 8:
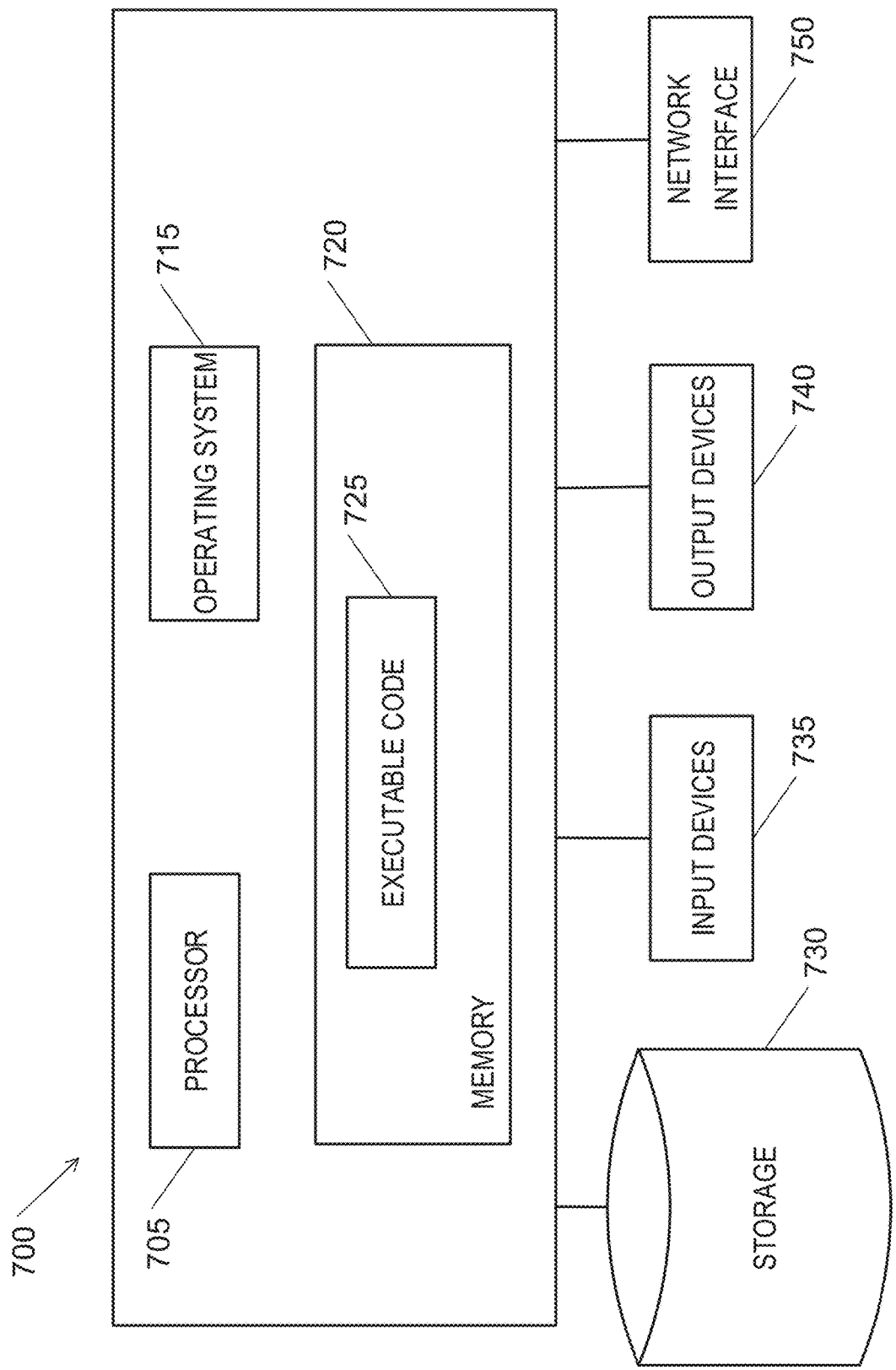
FIG. 8 shows a high-level block diagram of an exemplary computing device which may be used with embodiments of the present invention.

Reference is made to FIG. 1, which depicts a system 100 for predicting parameters of an input image 110, according to embodiment of the invention. The parameters of input image 110 may include parameters (P) of a 3D head parametric model, camera parameters (C) (e.g., parameters related to the camera such as intrinsic or extrinsic parameters such as focal length, aperture, field-of-view, resolution, etc), hair parameters (H) (e.g., parameters related to the hair in the 3D model such as hair color, location, pattern, density, etc.) and wrinkle parameters (W) (e.g., parameters related to the wrinkles in the 3D model such as location, pattern, depth, width, etc.). It should be understood in advance that the components, and functions shown in FIG. 1 are intended to be illustrative only and embodiments of the invention are not limited thereto. While in some embodiments the system of FIG. 1 is implemented using systems as shown in FIG. 8, in other embodiments other systems and equipment can be used.

Input image 110 may include a digital image of a face of a human, and may be a 2D image from a training dataset. Input image 110 may be provided or fed to at least one preparatory network 120 to obtain an estimation or prediction of image features 130, including for example, 3D landmarks (L') 132, facial features (F') 134, and segmentation maps (S') 136, where the tag next to the variable indicates that it is an estimated variable. According to some embodiments, at least one preparatory network 120 may include a 3D landmark detector network 122, a feature extractor (FE) network 124, and a face segmentation (FS) or face parsing network 126, and input image 110 may be provided to 3D landmark detector network 122 to obtain the 3D landmarks (L'), to feature extractor network 124 to obtain facial features (F') 134, and to face segmentation network 126 to obtain segmentation maps (S') 136. Some or all of 3D landmark detector network 132, feature extractor network 124, and face segmentation network 126 may be pretrained, e.g., propriety or of-the-shelf publicly available networks, that are already trained for their intended use.

3D landmarks (L') 132 may include the coordinates of specific, typically meaningful, points in input image 110. For a facial image, the landmarks may, for example, correspond to the eyes, nose, mouth, and jawline or other parts or points in the face, and the 3D landmarks (L') 132 may include for example the (x,y,z) coordinates of those points. Various methods for finding the 3D landmarks (L) 132 exist, typically including various types of deep NNs trained for that task.

Facial features (F') 134 may include various features related to the face, including expression features, face recognition features, mouth shape features, eyes shape features, etc. Those features may include or be represented by embeddings generated by networks trained for tasks related to face processing. The tasks related to face processing may include face recognition, emotion detection, animation keypoint detection, etc. Numerous networks trained for these and/or other face processing related tasks exist, and one or a combination of more than one such networks may be used for feature extractor network 124. If a combination of more than one networks is used, the facial features 134 may include a combination of the embeddings generated by those networks.

Segmentation maps (S') 136 may include classification of pixels of input image 110 (or the face in input image 110) into different classes. For example, segmentation maps (S') 136 may include classification of pixels of the face in input image 110 into the following example classes: background, skin, hair, beard, left brow, right brow, left eye, right eye, lips, and teeth. Other classes may be used. Face segmentation (FS) or face parsing network 126 may include a network trained to classify pixels of input image 110 into the desirable classes.

Parameter regressor network (M1) 140 may obtain one or more of 3D landmarks (L') 132, facial features (F') 134 and segmentation maps (S') 136, and may predict parameters 150. Parameters 150 may include some or all of parameters of a 3D face parametric model (P'), camera parameters (C') 162, hair parameters (H') 164 and wrinkle parameters (W') 166. In some embodiments, the 3D face parametric model is a FLAME model, and the parameters of the 3D face parametric model (P') 150 may include one or more of shape parameters (P_SHAPE') 152, expression parameters (P_EXPRESSION') 154, jaw parameters (P_JAW') 156, neck parameters (P_NECK') 158 and translation parameters (P_TRANSLATION') 160 of the FLAME model. Other 3D face parametric models, and/or other parameters of the FLAME model (e.g., identity, shape, pose and expression parameters) may be used. The FLAME model may refer to a 3D head model that includes a discrete explicit mesh representation (e.g., 3D vertices, edges, and polygons) of a human face, alongside blendshapes and joints which allow controllable shape, expression and pose.

Figure 2:
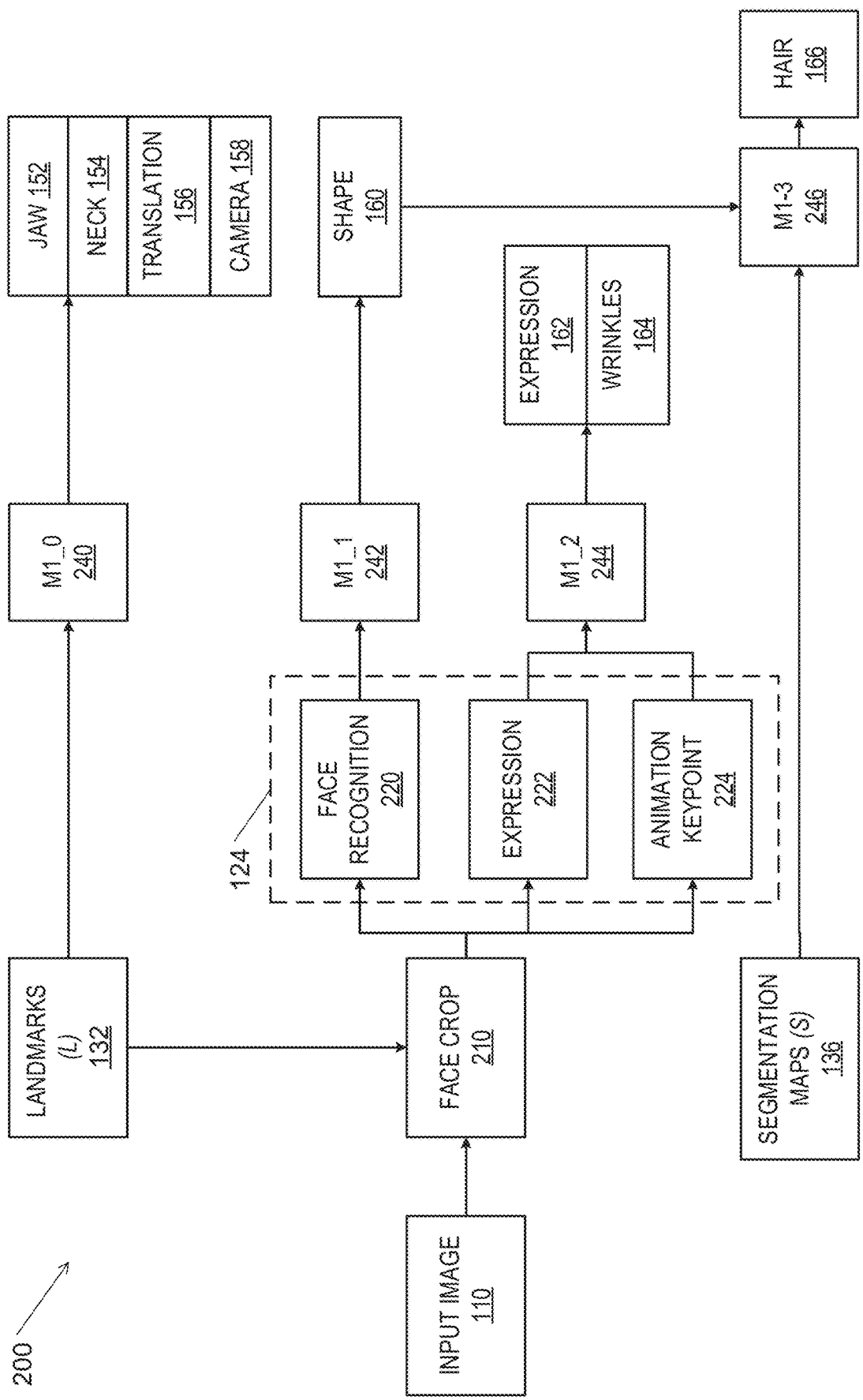
FIG. 2 depicts a system for predicting the parameters of an input image, according to embodiment of the invention.

Reference is made to FIG. 2, which depicts a system 200 for predicting the parameters of input image 110, according to embodiment of the invention. It should be understood in advance that the components, and functions shown in FIG. 2 are intended to be illustrative only and embodiments of the invention are not limited thereto. While in some embodiments the system of FIG. 2 is implemented using systems as shown in FIG. 8, in other embodiments other systems and equipment can be used. System 200 may be an example elaboration of system 100, and similar components will be given the same reference numerals.

In the example system 200, feature extractor network 124 includes a face recognition network 220 that may generate a face recognition embedding (FR), a face expression detection network 222 that may generate an expression embedding (EF), a mouth animation keypoint estimation network 224 that may generate a mouth animation keypoint (KP), and the facial features 134 (presented in FIG. 1) may include a combination of the embeddings generated by networks 220, 222 and 224. Face recognition network 220, face expression detection network 222 and mouth animation keypoint estimation network 224 may all be propriety or of the shelf networks pretrained for their intended task.

In the example system 200, input image 110 may be cropped to include the face only, using 3D landmarks (L) 132, and the cropped image may be used for further processing. It is noted that input facial images may be similarly cropped in systems 100 and 300-600 although not specifically stated.

In the example system 200, parameter regressor network (M1) 140 includes four subnetworks: M1_0 240, M1_1 242, M1_2 244 and M1_3 246. In this implementation, feeding the 3D landmarks (L') 132, the facial features (F') 134, and the segmentation maps (S') 136 into parameter regressor network (M1) 140 includes:

feeding the 3D landmarks (L') 132 into M1_0 240 to predict jaw parameters (P_JAW') 152, neck parameters (P_NECK') 154 and translation parameters (P_TRANSLATION') 156 and camera parameters (C') 158, feeding the face recognition embedding (FR) generated by face recognition network 220 into M1_1 242 to predict shape parameters (P_SHAPE'), and feeding the expression embedding (EF) generated by expression detection network 222 and the mouth animation keypoint (KP) generated by mouth animation keypoint estimation network 224 into M1_2 244 to predict expression parameters (P_EXPRESSION') 162 and wrinkle parameters (W') 164; and feeding shape parameters (P_SHAPE') 160 and segmentation maps (S') 136 into M1_3 246 to predict hair parameters (H') 166.

Figure 3:
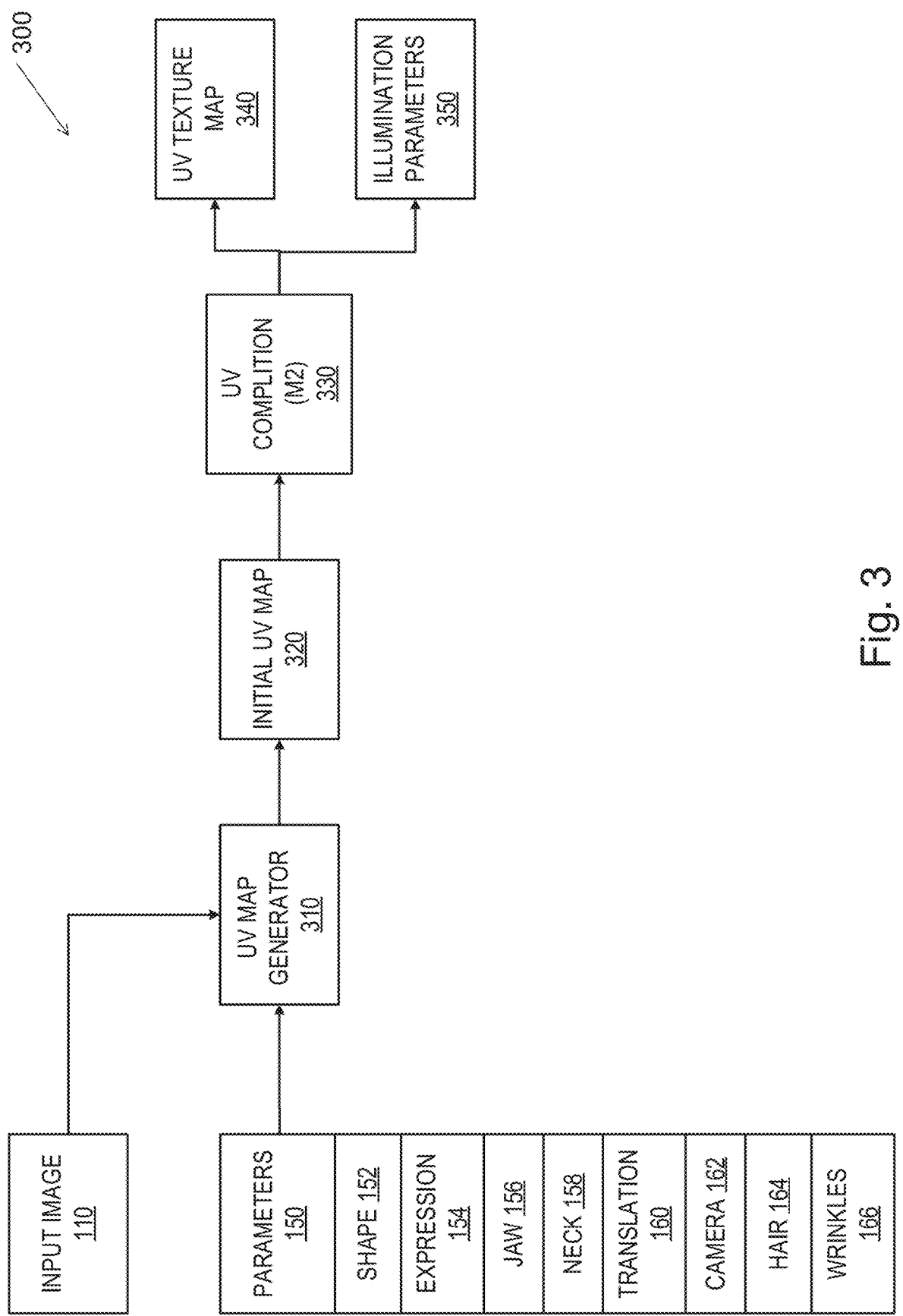
FIG. 3 depicts a system for predicting the UV texture and light information parameters of the input image, according to embodiment of the invention.

Reference is made to FIG. 3, which depicts a system 300 for predicting the UV texture and light information parameters of the input image, according to embodiment of the invention. It should be understood in advance that the components, and functions shown in FIG. 3 are intended to be illustrative only and embodiments of the invention are not limited thereto. While in some embodiments the system of FIG. 3 is implemented using systems as shown in FIG. 8, in other embodiments other systems and equipment can be used. System 300 includes some components of systems 100 and 200 that will be given the same reference numerals.

UV map generation block 310 may obtain input image 110, and parameters 150, including for example, parameters (P'), e.g., shape parameters (P_SHAPE') 152, expression parameters (P_EXPRESSION') 154, jaw parameters (P_JAW') 156, neck parameters (P_NECK') 158 and translation parameters (P_TRANSLATION') 160 of the FLAME model, and camera parameters (C'), hair parameters (H') and wrinkle parameters (W'). UV map generation block 310 may generate an initial UV texture map (UV_0') 320 from input 2D image 110 using parameters 150.

UV mapping or unwrapping may refer to the process of generating a 2D representation, also referred to as the UV texture map, of a 3D object, where the letters "U" and "V" denote the X and Y axes of the 2D representation, the 2D representation may correspond to the 3D model being unfolded and laid out flat on a 2D plain. The UV texture map may be used to generate a 3D model in a 3D modeling process, referred to as wrapping, by projecting the 2D representation (e.g., the UV texture map) onto the surface of the 3D model.

UV map generation block 310 may generate an initial UV texture map (UV_0') 320 from input image 110. Thus, UV map generation block 310 may take a normal 2D image of a face (input image 110), and convert it into an initial UV texture map (UV_0') 320 that may theoretically be used to generate a 3D model by wrapping, e.g., projecting, initial UV texture map (UV_0') 320 onto the surface of the 3D model. Software tools exist that may generate initial UV texture map (UV_0') 320 from input image 110, for example, this may be achieved by a network (e.g., a NN) trained for that purpose.

However, since input image 110 is a 2D image of a face, there may be some information missing for generating a complete UV texture map from input image 110 and parameters (P'), e.g., areas in the face that are hidden or not detailed enough in input image 110 may be missing or have lower resolution in initial UV texture map (UV_0') 320. According to embodiments of the invention, a dedicated network, e.g., UV completion network (M2) 330 may obtain or be fed with initial UV texture map (UV_0') 320, and may generate full UV texture map (UV') 340 and illumination parameters (LI') 350 that may include details that are not present in input image 110. In some embodiments, parameter regressor network (M1) 140 (depicted in FIG. 1) and UV completion network (M2) 330 may be trained together, as disclosed herein.

Figure 4:
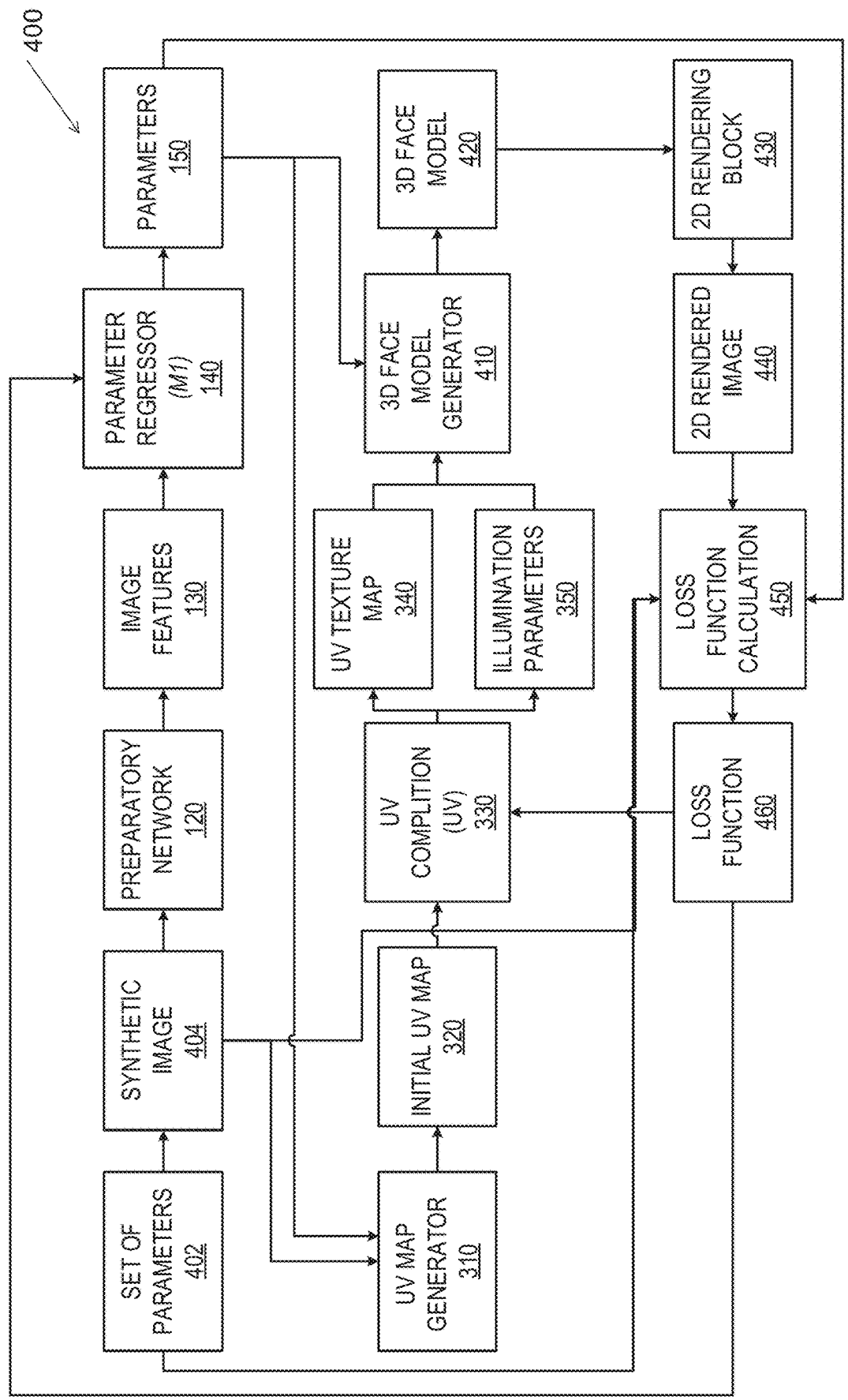
FIG. 4 depicts a system for jointly training parameter regressor network (M1) and UV completion network (M2) using synthetic images, according to embodiment of the invention.

Reference is made to FIG. 4, which depicts a system 400 for jointly training parameter regressor network (M1) 140 and UV completion network (M2) 330 using synthetic images 404, according to embodiment of the invention. It should be understood in advance that the components, and functions shown in FIG. 4 are intended to be illustrative only and embodiments of the invention are not limited thereto. While in some embodiments the system of FIG. 4 is implemented using systems as shown in FIG. 8, in other embodiments other systems and equipment can be used. System 400 may include some components of systems 100, 200 and 300 that will be given the same reference numerals.

According to embodiments of the invention, system 400 may use synthetic images 404 to train parameter regressor network (M1) 140 and UV completion network (M2) 330. A synthetic image 404 may be generated from a set of parameters 402. For example, the set of parameters may be similar to parameters 150, e.g., the set of parameters 402 may include parameters of 3D face parametric model (P), synthetic camera parameters (C), synthetic hair parameters (H) and synthetic wrinkle parameters (W). In some embodiments, each parameter in the set of parameters 402 (P, C, H, W) may be sampled randomly from a uniform distribution of that parameter values in a predetermined range. Other methods for selecting the set of parameters may be used, for example, using other distributions and other sampling methodologies. Once the set of parameters 402 are generated or selected, a synthetic image 404 may be generated using those parameters, e.g., by a dedicated software tool or by a network trained for that purpose. Synthetic image 404 may be or may include a facial image with parameters that equal the set of parameters. Synthetic image 404 may be provided or fed (possibly after cropping) into preparatory network 120 to generate image features 130 similarly to systems 100 and 200. For example, preparatory network 120 may include 3D landmark detector network 122, a feature extractor (FE) network 124, and a face segmentation (FS) or face parsing network 126, feature extractor (FE) network 124 may include face recognition network 220, face expression detection network 222 and mouth animation keypoint estimation network 224, and image features 130 may include 3D landmarks (L') 132, facial features (F') 134, and segmentation maps (S') 136.

Image features 130 (e.g., 3D landmarks (L') 132, facial features (F') 134, and segmentation maps (S') 136 may be provided or fed into parameter regressor network (M1) 140, that as disclosed herein may include subnetworks: M1_0 240, M1_1 242, M1_2 244 and M1_3 246. Parameter regressor network (M1) 140 may generate or predict, in a feed forward process, parameters 150, that may include parameters of a 3D face parametric model (P') 150, camera parameters (C') 158, hair parameters (H') 166 and wrinkle parameters (W') 164. A tag indicates that parameters (P', C', H', W') 150 are predicted, as opposed to the set of parameters 402 (P, C, H, W) used for generating synthetic image 404.

Parameters (P', C', H', W) 150 and synthetic image 404 may be provided or fed into UV map generation block 310 that may generate an initial UV texture map (UV_0') 320. The initial UV texture map (UV_0') 320 may be provided or fed into a UV completion network (M2) 330 to get a full UV texture map (UV') 340 and illumination parameters (LI') 350. Parameters (P', C', H', W') 150, full UV texture map (UV') 340 and illumination parameters (LI') 350 may be provided to 3D face model generator 410, that may reconstruct or generate a 3D face model 420 from parameters (P', C', H', W') 150, full UV texture map (UV') 340 and illumination parameters (LI') 350. 2D rendering block 430 may render a 2D rendered image 440, that may include a reconstructed 2D image of the face.

Theoretically, if network 400 was perfect, 2D rendered image 440 should be identical or substantially identical to synthetic image 404. However, since system 400 may not be ideal, specifically during the training process, there may be differences between 2D rendered image 440 and synthetic image 404. Similarly, if network 400 was perfect, parameters (P', C', H', W') 150 should be identical or substantially identical to the set of parameters (P, C, H, W) 402. Again, since system 400 may not be ideal, specifically during the training process, there may be differences between parameters (P', C', H', W) 150 and the set of parameters (P, C, H, W) 402. Loss function calculation block 450 may calculate a loss function 460 based on differences between synthetic image 404 and 2D rendered image 440 and based on differences between parameters (P', C', H', W') 150 and the set of parameters (P, C, H, W) 402. Specifically, loss function 460 may include a combination of at least one of a regression loss calculated between each one of parameters (P', C', H', W') 150 and ground truth set of parameters (P, C, H, W) 402 of synthetic image 404, a perceptual loss calculated between each one of parameters (P', C', H', W') 150 and ground truth set of parameters (P, C, H, W) 402 of synthetic image 404, a reconstruction loss calculated between synthetic image 404 and the 2D rendered image 440, and a perceptual loss calculated between synthetic image 404 and the 2D rendered image 440.

The regression loss may measure a distance between each one of parameters (P', C', H', W') 150, e.g., the predicted parameters, and ground truth set of parameters (P, C, H, W)

402, e.g., the labels. The distance may be measured using a distance metric, e.g., mean-squared error (MSE), cross-entropy, L1 loss, e.g., the median absolute error (MAE), or L2 loss, e.g., the root mean squared error (RMSE). The reconstruction losses may measure how close the system output is to the original input, and may be calculated or computed using a distance metric, e.g., MSE, cross-entropy, L1 loss, e.g., MAE, or L2 loss, e.g., RMSE. The perceptual loss may measure the difference between the high-level features of two images, e.g., synthetic image 404 and the 2D rendered image 440. Loss function 460 may used to adjust weights and other coefficients of parameter regressor network (M1) 140 and UV completion network (M2) 330 in a back propagation process.

Figure 5:
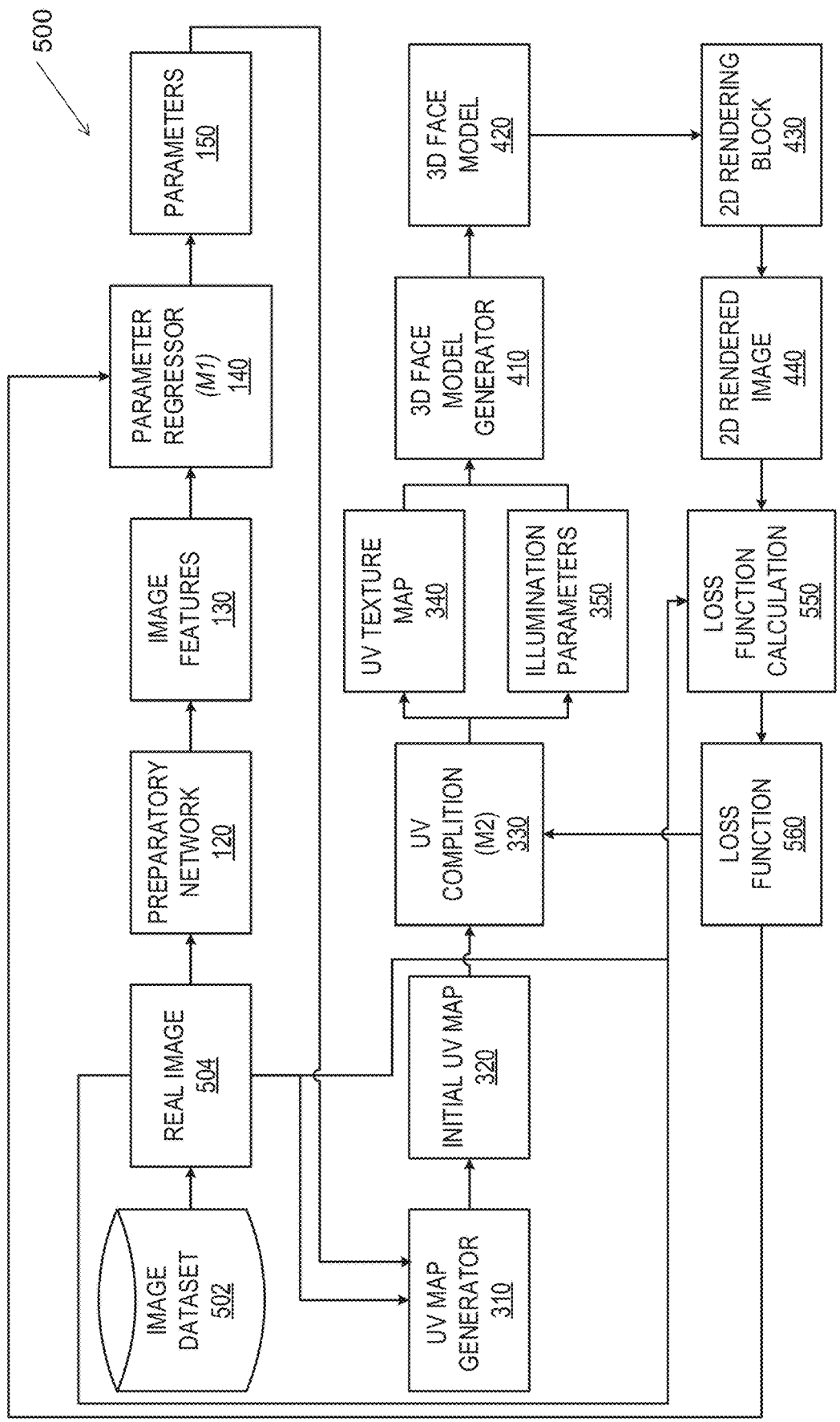
FIG. 5 depicts a system for jointly training parameter regressor network (M1) and UV completion network (M2) using real images, according to embodiment of the invention.

Reference is made to FIG. 5, which depicts a system 500 for jointly training parameter regressor network (M1) 140 and UV completion network (M2) 330 using real images 504, according to embodiment of the invention. It should be understood in advance that the components, and functions shown in FIG. 5 are intended to be illustrative only and embodiments of the invention are not limited thereto. While in some embodiments the system of FIG. 5 is implemented using systems as shown in FIG. 8, in other embodiments other systems and equipment can be used. System 500 includes some components of systems 100, 200, 300 and 400 that will be given the same reference numerals.

Real images 504 may include facial images of real people, for example, taken from image dataset 502. Real images 504 may undergo substantially the same process of synthetic images 404, only loss function 560, calculated by loss function calculation block 550, may be different. Loss function 560 may not include the regression loss and the perceptual loss calculated between each one of parameters (P', C', H', W') 150 and ground truth set of parameters (P, C, H, W) 402 since ground truth set of parameters (P, C, H, W) of real images 504 is not known. Loss function 560 may include a combination of one or more of a reconstruction loss calculated between real image 504 and the 2D rendered image 440, a perceptual loss calculated between real image 504 and the 2D rendered image 440, and a regularization loss calculated on the shape parameters (P_SHAPE') 152 and the expression parameters (P_EXPRESSION') 154. Regularization loss may refer to an additional term added to the loss function, and may include Lasso regularization (L1), e.g., adding the penalty equivalent to the sum of the absolute values of coefficients, Ridge regularization (L2), e.g., adding the penalty equivalent to the sum of the squares of the magnitude of coefficients, or other regulation terms.

In some embodiments, method 500 may be repeated for a plurality of real mages 504 of a single person taken from different angles, and the loss function 560 may further include consistency loss calculated on the shape parameters (P_SHAPE') 152 of the plurality of real mages 504 of a single person taken from different angles, and a consistency loss calculated on the full UV texture maps (UV') 340 of the plurality of real images 504 of a single person taken from different angles.

According to embodiments of the invention, parameter regressor network (M1) 140 and UV completion network (M2) may be trained using a dataset of synthetic images 404, as disclosed with relation to FIG. 4, with a dataset 502 of real images 504, as disclosed with relation to FIG. 5, or with a combination of both. According to some embodiments, parameter regressor network (M1) 140 and UV completion network (M2) may be trained using both datasets concurrently, e.g., first with a dataset of synthetic images 404 and then with a dataset 502 of real images 504, or the other way around. Additionally or alternatively, parameter regressor network (M1) 140 and UV completion network (M2) may be trained using both datasets in parallel. For example, for each step in the training process a mini-batch of synthetic images 404 and real images 504 may be processed as disclosed herein with relation to FIGS. 4 and 5, respectively, only the loss functions 460 and 560 may be combined, e.g., summed or averaged, and used as the loss function for adjusting the weights in parameter regressor network (M1) 140 and UV completion network (M2).

Figure 6:
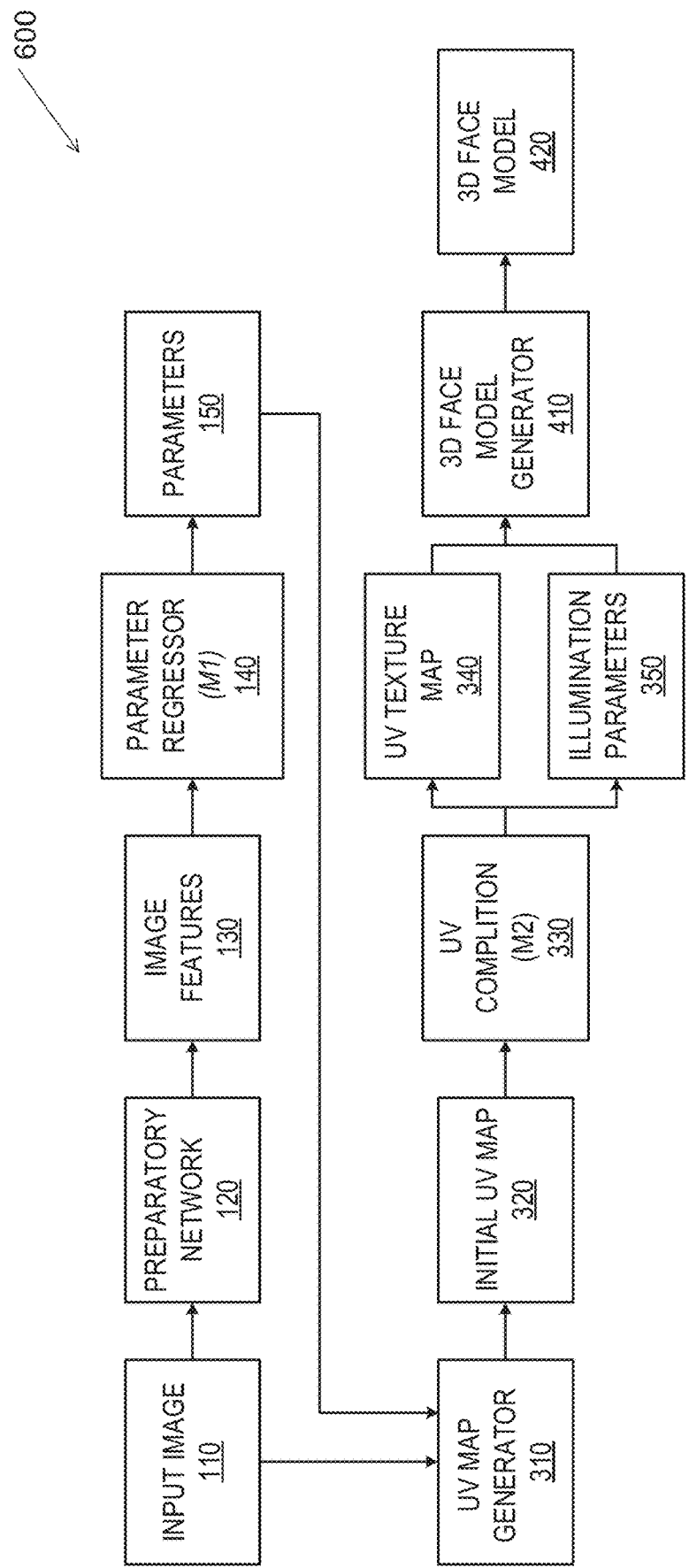
FIG. 6 depicts a system for reconstructing a three-dimensional (3D) face model from an input 2D image, according to embodiment of the invention.

Reference is made to FIG. 6, which depicts a system 600 for reconstructing a three-dimensional (3D) face model from an input 2D image, according to embodiment of the invention. It should be understood in advance that the components, and functions shown in FIG. 6 are intended to be illustrative only and embodiments of the invention are not limited thereto. While in some embodiments the system of FIG. 6 is implemented using systems as shown in FIG. 8, in other embodiments other systems and equipment can be used. System 600 includes some components of systems 100, 200, 300 and 400 that will be given the same reference numerals.

Input image 110, e.g., a new 2D facial image, may be provided or fed into preparatory network 120, that may include 3D landmark detector 122, feature extractor 124 and face segmentation network 126, to generate image features 130, including for example, 3D landmarks (L') 132, facial features (F') 134, and segmentation maps (S') 136. Input image 110, may be cropped, e.g., as in block 210, before being fed into preparatory network 120. Image features 130 may be provided or fed into trained parameter regressor network (M1) 140, that may predict parameters 150, e.g., including parameters of a 3D face parametric model (P'), e.g., shape parameters (P_SHAPE') 152, expression parameters (P_EXPRESSION') 154, jaw parameters (P_JAW') 156, neck parameters (P_NECK') 158 and translation parameters (P_TRANSLATION') 160 of the FLAME model, camera parameters (C') 162, hair parameters (H') 164 and wrinkle parameters (W') 166. Parameters 150 and input image 110 may be provided or fed into UV map generation block 310 that may generate an initial UV texture map (UV_0') 320 from input image 110 using parameters 150. Initial UV texture map (UV_0') 320 may be provided or fed into trained UV completion network (M2) 330 that may generate full UV texture map (UV') 340 and illumination parameters (LI') 350, for completing areas that are missing in the initial UV texture map. Full UV texture map (UV') 340 and illumination parameters (LI') 350 may be provided or fed into 3D face model generator 410, that may reconstruct or generate a 3D face model 420 from full UV texture map (UV') 340 and illumination parameters (LI') 350.

While not shown, it is noted that in some embodiments, already trained parameter regressor network (M1) 140 and UV completion network (M2) 330, may be further trained for the particular input image 110, by following the process described with relation to FIG. 5.

Figure 7:
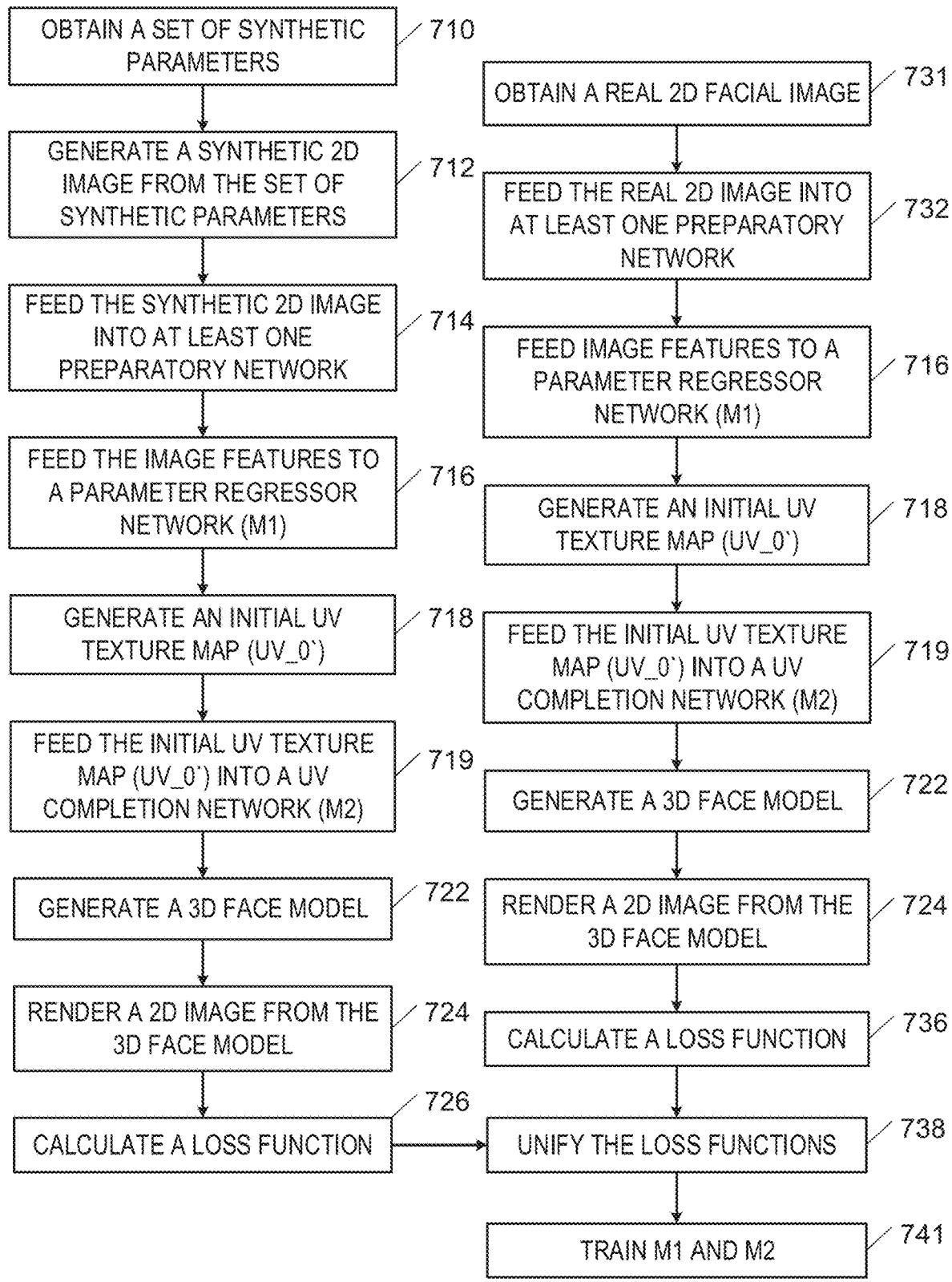
FIG. 7 is a flowchart of a method for jointly training networks for generating a 3D facial model from a 2D facial image, according to embodiments of the invention.

Reference is now made to FIG. 7, which is a flowchart of a method for jointly training networks for generating a 3D facial model from a 2D facial image, according to embodiments of the invention. While in some embodiments the operations of FIG. 7 are carried out using systems as shown in FIGS. 1-6 and 8, in other embodiments other systems and equipment can be used.

In operation 710, a processor (e.g., processor 705 depicted in FIG. 8) may generate, obtain or select a set of synthetic parameters, e.g., parameters of 3D face parametric model (P), synthetic camera parameters (C), synthetic hair parameters (H) and synthetic wrinkle parameters (W). In some embodiments, the processor may select each parameter in the set of parameters (P, C, H, W) by randomly samplings a parameter value from a uniform distribution of that parameter in a predetermined range. Other methods for selecting the set of parameters may be used. In operation 712, the processor may generate a synthetic 2D facial image from the set of synthetic parameters using any applicable method, e.g., using a network pretrained for that purpose. In operation 714, the processor may feed the synthetic facial 2D image into at least one preparatory network to generate 3D landmarks (L'), facial features (F') and segmentation maps (S'). In some embodiments, the at least one preparatory network may include a 3D landmark detector network used to obtain the 3D landmarks (L'), a feature extractor network used to obtain facial features (F'), and a face segmentation network used to obtain segmentation maps (S'). In some embodiments, the feature extractor network may include a pre-trained face recognition network to produce face recognition embedding (FR), a pre-trained expression recognition network to produce an expression embedding (EF), and a pre-trained animation keypoint network to produce a mouth animation keypoint (KP).

In operation 716, the processor may feed the image features to a parameter regressor network (M1) to predict parameters of a 3D face parametric model (P'), camera parameters (C'), hair parameters (H') and wrinkle parameters (W'). In some embodiments, the parameter regressor network (M1) includes four subnetworks: M1_0, M1_1, M1_2, M1_3, and feeding the 3D landmarks (L'), the facial features (F'), and the segmentation maps (S') into the parameter regressor network (M1) includes feeding the 3D landmarks (L) into M1_0 to predict jaw parameters (P_JAW'), neck parameters (P_NECK') and translation parameters (P_TRANSLATION') and camera parameters (C'), feeding the face recognition embedding (FR') into M1_1 to predict shape parameters (P_SHAPE'), feeding the expression embedding (EF') and the mouth animation keypoint (KP) into M1_2 to predict expression parameters (P_EXPRESSION') and wrinkle parameters (W), and feeding the shape parameters (P_SHAPE') and the segmentation maps (S') into M1_3 to predict the hair parameters (H'). In some embodiments, the 3D face parametric model is a FLAME model, and the parameters of the 3D face parametric model (P) include jaw parameters (P_JAW'), neck parameters (P_NECK'), translation parameters (P_TRANSLATION'), shape parameters (P_SHAPE') and expression parameters (P_EXPRESSION').

In operation 718, the processor may generate an initial UV texture map (UV_0') from the input 2D image and (P', C', H', W), using any applicable method, e.g., a network pretrained for that task. In operation 719, the processor may feed the initial UV texture map (UV_0') into a UV completion network (M2) to get or generate a full UV texture map (UV') and illumination parameters (LI'). In operation 722, the processor may reconstruct or generate a 3D face model from (P', C', H', W', UV', LI') using any applicable method, e.g., a network pretrained for that task. In operation 724, the processor may render a 2D image from the 3D face model. In operation 726, the processor may calculate a loss function based on differences between the input synthetic facial 2D image and the rendered 2D image. For example, the loss function may include a combination of at least one of:
    a regression loss calculated between each one of the parameters P', C', H', W' and the synthetic parameters P, C, H, W of the synthetic facial 2D image,
    a perceptual loss calculated between each one of the parameters P', C', H', W' and the synthetic parameters P, C, H, W of the synthetic facial image,
    a reconstruction loss calculated between the synthetic facial 2D image and the rendered 2D image, and
    a perceptual loss calculated between the synthetic facial 2D image and the rendered 2D image.

In operation 731, the processor may obtain a real 2D facial image, e.g., a facial image of a real person. In operation 731, the processor may feed the real 2D image into at least one preparatory network and the image may undergo similar method steps as the synthetic input image. Except for operation 736, in which the processor may calculate a loss function based on difference between the real 2D facial image and the rendered image. The loss function may include a combination of at least one of:
    a reconstruction loss calculated between the real 2D facial image and the rendered 2D image.
    a perceptual loss calculated between the real 2D facial image and the rendered 2D image,
    a regularization loss calculated on the shape parameters (P_SHAPE') and the expression parameters (P_EXPRESSION'),
    a consistency loss calculated on the shape parameters (P_SHAPE') of input 2D mages of a single person taken from different angles, and
    a consistency loss calculated on the full UV texture maps (UV') of real 2D facial images of a single person taken from different angles.

In operation 731, the processor may unify the loss functions obtained from the synthetic images in operation 726 and from the real facial images in operation 736 using any applicable method, e.g., by summing or averaging. It is noted that operation 738 is not mandatory and the processor may use the loss functions of the synthetic images in operation 726 or the loss functions obtained from the real facial images in operation 736. In operation 741, the processor may train M1 and M2 using the loss function generated in operations 726, 736 or 738. The training may continue until a stopping criterion is met, e.g., until the differences between the rendered image and the original image are below a threshold or any other criterion.

After training is completed, a new facial 2D image may be obtained and operations 732, 716-722 may be performed with the trained networks M1 and M2 to generate a 3D face model corresponding to the new facial 2D image.

FIG. 8 shows a high-level block diagram of an exemplary computing device which may be used with embodiments of the present invention. Computing device 700 may include a controller or processor 705 that may be or include, for example, one or more central processing unit processor(s) (CPU), one or more Graphics Processing Unit(s) (GPU), a chip or any suitable computing or computational device, an operating system 715, a memory 720, a storage 730, input devices 735 and output devices 740. Each of modules and equipment such as systems 100-600 and other modules or equipment mentioned herein may be or include, or may be executed by, a computing device such as included in FIG. 8 or specific components of FIG. 8, although various units among these entities may be combined into one computing device.

Operating system 715 may be or may include any code segment designed and/or configured to perform tasks involving coordination, scheduling, supervising, controlling or otherwise managing operation of computing device 700, for example, scheduling execution of programs. Memory 720 may be or may include, for example, a Random Access Memory (RAM), a read only memory (ROM), a Dynamic RAM (DRAM), a volatile memory, a non-volatile memory, a cache memory, or other suitable memory units or storage units. Memory 720 may be or may include a plurality of possibly different memory units. Memory 720 may store for example, instructions to carry out a method (e.g., code 725), and/or data such as model weights, etc.

Executable code 725 may be any executable code, e.g., an application, a program, a process, task or script. Executable code 725 may be executed by processor 705 possibly under control of operating system 715. For example, executable code 725 may when executed carry out methods according to embodiments of the present invention. For the various modules and functions described herein, one or more computing devices 700 or components of computing device 700 may be used. One or more processor(s) 705 may be configured to carry out embodiments of the present invention by for example executing software or code.

Storage 730 may be or may include, for example, a hard disk drive, a floppy disk drive, a Compact Disk (CD) drive, or other suitable removable and/or fixed storage unit. Data such as instructions, code, images, training data, NN weights and parameters etc. may be stored in a storage 730 and may be loaded from storage 730 into a memory 720 where it may be processed by processor 705. Some of the components shown in FIG. 8 may be omitted.

Input devices 735 may be or may include for example a mouse, a keyboard, a touch screen or pad or any suitable input device. Any suitable number of input devices may be operatively connected to computing device 700 as shown by block 735. Output devices 740 may include displays, speakers and/or any other suitable output devices. Any suitable number of output devices may be operatively connected to computing device 700 as shown by block 740. Any applicable input/output (I/O) devices may be connected to computing device 700, for example, a modem, printer or facsimile machine, a universal serial bus (USB) device or external hard drive may be included in input devices 735 or output devices 740. Network interface 750 may enable device 700 to communicate with one or more other computers or networks. For example, network interface 750 may include a wired or wireless NIC.

Embodiments of the invention may include one or more article(s) (e.g. memory 720 or storage 730) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

One skilled in the art will realize the invention may be embodied in other specific forms using other details without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein. In some cases well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" can include, for example, "multiple" or "two or more". The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

What is claimed is:

1. A method for reconstructing a three-dimensional (3D) face model from an input 2D image of the face, the method comprising:
   feeding the input 2D image into at least one preparatory network to generate image features;
   feeding the image features to a parameter regressor neural network to predict at least one of: parameters of a 3D face parametric model, camera parameters, hair parameters and wrinkle parameters;
   generating an initial UV texture map using the input 2D image and the at least one of the parameters of the 3D face parametric model, the camera parameters, the hair parameters or the wrinkle parameters;
   feeding the initial UV texture map into a UV completion neural network to generate a full UV texture map and illumination parameters, for completing areas that are missing in the initial UV texture map; and
   generating the 3D face model using the parameters of the 3D face parametric model, the camera parameters, the hair parameters, the wrinkle parameters, the full UV texture map and the illumination parameters,
   wherein the parameter regressor neural network and the UV completion neural network are jointly trained using, as the input 2D image, a synthetic 2D image that is generated from a set of synthetic parameters.

2. The method claim 1, comprising:
   rendering a rendered 2D image from the 3D face model;
   calculating a loss function based on differences between the input 2D image and the rendered 2D image; and
   training the parameter regressor neural network and the UV completion neural network using the loss function to obtain a trained parameter regressor neural network and a trained UV completion neural network.

3. The method of claim 2, wherein the loss function comprises a combination of at least one of:
   a reconstruction loss calculated between the input 2D image and the rendered 2D image,
   a perceptual loss calculated between the input 2D image and the rendered 2D image,
   a regularization loss calculated on the shape parameters and the expression parameters,
   a consistency loss calculated on the shape parameters of input 2D mages of a single person taken from different angles, and a consistency loss calculated on the full UV texture maps of input 2D mages of a single person taken from different angles.

4. The method claim 1, wherein the image features comprise 3D landmarks, facial features, and segmentation maps, and wherein the at least one preparatory network comprises:
- a 3D landmark detector network used to obtain the 3D landmarks;
- a feature extractor (FE) network used to obtain facial features; and
- a face segmentation (FS) network used to obtain segmentation maps.

5. The method of claim 4, wherein the feature extractor network comprises a pre-trained face recognition network to produce face recognition embedding, a pre-trained expression recognition network to produce an expression embedding, and a pre-trained animation keypoint network to produce a mouth animation keypoint.

6. The method of claim 1, wherein the 3D face parametric model is a faces learned with an articulated model and expressions (FLAME) model, and wherein the parameters of the 3D face parametric model comprise jaw parameters, neck parameters, translation parameters, camera parameters, shape parameters and expression parameters.

7. The method of claim 1, wherein the image features comprise 3D landmarks, facial features, and segmentation maps, and wherein the parameter regressor neural network comprises subnetworks M1_0, M1_1, M1_2, M1_3, wherein feeding the 3D landmarks, the facial features, and the segmentation maps into the parameter regressor network comprises:
- feeding the 3D landmarks into subnetwork M1_0 to predict jaw parameters, neck parameters and translation parameters and camera parameters;
- feeding the face recognition embedding into subnetwork M1_1 to predict shape parameters;
- feeding the expression embedding and the mouth animation keypoint into subnetwork M1_2 to predict expression parameters and wrinkle parameters; and
- feeding the shape parameters and the segmentation maps into M1_3 subnetwork to predict the hair parameters,
- wherein the parameters of the 3D face parametric model comprise the jaw parameters, the neck parameters, the translation parameters, the shape parameters and the expression parameters.

8. The method of claim 1, wherein training the parameter regressor neural network and the UV completion neural network using the synthetic image is performed by:
- selecting at least one of synthetic parameters of the 3D face parametric model, synthetic camera parameters, synthetic hair parameters and synthetic wrinkle parameters by sampling a parameter value from a distribution of that parameter in a predetermined range; and
- generating the input 2D image from the at least one of synthetic parameters of the 3D face parametric model, the synthetic camera parameters, the synthetic hair parameters and the synthetic wrinkle parameters,
- rendering a rendered 2D image from the 3D face model; and
- training the parameter regressor neural network and the UV completion neural network using a loss function to obtain a trained parameter regressor network and a trained UV completion neural network, wherein the loss function is based on differences between the at least one of synthetic parameters of the 3D face parametric model, the synthetic camera parameters, the synthetic hair parameters and the synthetic wrinkle parameters and the corresponding parameters of a 3D face parametric model, camera parameters, hair parameters and wrinkle parameters.

9. The method of claim 8, wherein the loss function comprises a combination of at least one of:
- a regression loss calculated between each one of the parameters of the 3D face parametric model, the camera parameters, the hair parameters and the wrinkle parameters and the synthetic parameters of the 3D face parametric model, the synthetic camera parameters, the synthetic hair parameters and the synthetic wrinkle parameters of the input 2D image,
- a perceptual loss calculated between each one of the parameters of the 3D face parametric model, the camera parameters, the hair parameters and the wrinkle parameters and the synthetic parameters of the 3D face parametric model, the synthetic camera parameters, the synthetic hair parameters and the synthetic wrinkle parameters of the input 2D image,
- a reconstruction loss calculated between the input 2D image and the rendered 2D image, and
- a perceptual loss calculated between the input 2D image and the rendered 2D image.

10. The method of claim 1, wherein the synthetic 2D image comprises a facial image with parameters that equal the set of synthetic parameters, wherein the set of synthetic parameters comprises at least one of: synthetic parameters of a 3D face parametric model, synthetic camera parameters, synthetic hair parameters and synthetic wrinkle parameters.

11. A method for reconstructing a three-dimensional (3D) face model from an input 2D image of the face, the method comprising:
- feeding the input 2D image into at least one preparatory neural network to generate 3D landmarks, facial features and segmentation maps;
- feeding the 3D landmarks, the facial features, and the segmentation maps to a parameter regressor neural network to predict parameters of a 3D face parametric model, camera parameters, hair parameters and wrinkle parameters;
- generating an initial UV texture map using the input 2D image and the parameters of the 3D face parametric model, the camera parameters, the hair parameters, and the wrinkle parameters;
- feeding the initial UV texture map into a UV completion neural network to generate a full UV texture map and illumination parameters, for completing areas that are missing in the initial UV texture map; and
- generating the 3D face model using the parameters of the 3D face parametric model, the camera parameters, the hair parameters, the wrinkle parameters, the full UV texture map, and the illumination parameters,
- wherein the parameter regressor neural network and the UV completion neural network are jointly trained.

12. A system for reconstructing a three-dimensional (3D) face model from an input 2D image of the face, the system comprising:
- a memory; and
- a processor configured to:
  - feed the input 2D image into at least one preparatory neural network to generate image features;
  - feed the image features to a parameter regressor neural network to predict at least one of: parameters of a 3D face parametric model, camera parameters, hair parameters and wrinkle parameters;

generate an initial UV texture map using the input 2D image and the at least one of the parameters of the 3D face parametric model, the camera parameters, the hair parameters or the wrinkle parameters;

feed the initial UV texture map into a UV completion neural network to generate a full UV texture map and illumination parameters for completing areas that are missing in the initial UV texture map; and generate the 3D face model using the parameters of the 3D face parametric model, the camera parameters, the hair parameters, the wrinkle parameters, the full UV texture map and the illumination parameters, wherein the parameter regressor neural network and the UV completion neural network are jointly trained using, as the input 2D image, a synthetic 2D image that is generated from a set of synthetic parameters.

13. The system claim 12, comprising:
rendering a rendered 2D image from the 3D face model;
calculating a loss function based on differences between the input 2D image and the rendered 2D image; and
training the parameter regressor neural network and the UV completion neural network using the loss function to obtain a trained parameter regressor neural network and a trained UV completion neural network.

14. The system of claim 13, wherein the loss function comprises a combination of at least one of:
a reconstruction loss calculated between the input 2D image and the rendered 2D image,
a perceptual loss calculated between the input 2D image and the rendered 2D image,
a regularization loss calculated on the shape parameters and the expression parameters,
a consistency loss calculated on the shape parameters of input 2D mages of a single person taken from different angles, and
a consistency loss calculated on the full UV texture maps of input 2D mages of a single person taken from different angles.

15. The system claim 12, wherein the image features comprise 3D landmarks, facial features, and segmentation maps, and wherein the at least one preparatory neural network comprises:
a 3D landmark detector neural network used to obtain the 3D landmarks;
a feature extractor (FE) neural network used to obtain facial features; and
a face segmentation (FS) neural network used to obtain segmentation maps.

16. The system of claim 15, wherein the feature extractor neural network comprises a pre-trained face recognition neural network to produce face recognition embedding, a pre-trained expression recognition neural network to produce an expression embedding, and a pre-trained animation keypoint neural network to produce a mouth animation keypoint.

17. The system of claim 12, wherein the 3D face parametric model is a faces learned with an articulated model and expressions (FLAME) model, and wherein the parameters of the 3D face parametric model comprise jaw parameters, neck parameters, translation parameters, camera parameters, shape parameters and expression parameters.

18. The system of claim 12, wherein the image features comprise 3D landmarks, facial features, and segmentation maps, and wherein the parameter regressor neural network comprises neural subnetworks M1_0, M1_1, M1_2, M1_3, wherein the processor is configured to feed the 3D landmarks, the facial features, and the segmentation maps into the parameter regressor network by:

feeding the 3D landmarks into neural subnetwork M1_0 to predict jaw parameters, neck parameters and translation parameters and camera parameters;

feeding the face recognition embedding into neural subnetwork M1_1 to predict shape parameters;

feeding the expression embedding and the mouth animation keypoint into neural subnetwork M1_2 to predict expression parameters and wrinkle parameters; and feeding the shape parameters and the segmentation maps into neural subnetwork M1_3 to predict the hair parameters, wherein the parameters of the 3D face parametric model comprise the jaw parameters, the neck parameters, the translation parameters, the shape parameters and the expression parameters.

19. The system of claim 12, wherein training the parameter regressor neural network and the UV completion neural network using the synthetic image is performed by:

select at least one of synthetic parameters of the 3D face parametric model, synthetic camera parameters, synthetic hair parameters and synthetic wrinkle parameters by sampling a parameter value from a distribution of that parameter in a predetermined range; and generate the input 2D image from the at least one of synthetic parameters of the 3D face parametric model, the synthetic camera parameters, the synthetic hair parameters and the synthetic wrinkle parameters, rendering a rendered 2D image from the 3D face model; and training the parameter regressor neural network and the UV completion neural network using a loss function to obtain a trained parameter regressor neural network and a trained UV completion neural network, wherein the loss function is based on differences between the at least one of synthetic parameters of the 3D face parametric model, the synthetic camera parameters, the synthetic hair parameters and the synthetic wrinkle parameters and the corresponding parameters of a 3D face parametric model, camera parameters, hair parameters and wrinkle parameters.

20. The system of claim 19, wherein the loss function comprises a combination of at least one of:
a regression loss calculated between each one of the parameters of the 3D face parametric model, the camera parameters, the hair parameters and the wrinkle parameters and the synthetic parameters of the 3D face parametric model, the synthetic camera parameters, the synthetic hair parameters and the synthetic wrinkle parameters of the input 2D image,
a perceptual loss calculated between each one of the parameters of the 3D face parametric model, the camera parameters, the hair parameters and the wrinkle parameters and the synthetic parameters of the 3D face parametric model, the synthetic camera parameters, the synthetic hair parameters and the synthetic wrinkle parameters of the input 2D image,
a reconstruction loss calculated between the input 2D image and the rendered 2D image, and
a perceptual loss calculated between the input 2D image and the rendered 2D image.

* * * * *